United States Patent
Chan et al.

(10) Patent No.: US 9,537,918 B2
(45) Date of Patent: Jan. 3, 2017

(54) FILE SHARING WITH CLIENT SIDE ENCRYPTION

(71) Applicant: NEXTBIT SYSTEMS INC., San Francisco, CA (US)

(72) Inventors: Michael A. Chan, San Francisco, CA (US); Justin Quan, San Francisco, CA (US); Michael K. Fleming, San Francisco, CA (US)

(*) Notice: Subject to any disclaimer, the term of this patent is extended or adjusted under 35 U.S.C. 154(b) by 361 days.

(21) Appl. No.: 14/044,046

(22) Filed: Oct. 2, 2013

(65) Prior Publication Data

US 2014/0095881 A1    Apr. 3, 2014

Related U.S. Application Data

(60) Provisional application No. 61/708,794, filed on Oct. 2, 2012.

(51) Int. Cl.
*H04L 9/08* (2006.01)
*H04L 29/06* (2006.01)
(Continued)

(52) U.S. Cl.
CPC .............. *H04L 65/60* (2013.01); *G06F 8/62* (2013.01); *G06F 8/63* (2013.01); *G06F 9/4406* (2013.01);
(Continued)

(58) Field of Classification Search
CPC ............ G06F 17/30085; G06F 17/3015; G06F 17/3007; G06F 17/30194; G06F 9/4406; G06F 9/4416; G06F 8/62; G06F 8/63; G06F 21/6218; G06F 21/34; H04L 67/1097; H04L 65/60; H04L 67/2823; H04L 67/40; H04L 9/3226; H04L 67/42; H04L 67/10; H04L 67/2842; H04L 43/04; H04L 63/08; H04L 63/0428; H04L 63/0435; H04L 2209/16; H04L 63/0464; H04L 63/062; H04L 9/0825; H04L 2209/76; H04L 63/20; H04L 63/10; H04L 63/083; H04W 8/24

See application file for complete search history.

(56) References Cited

U.S. PATENT DOCUMENTS

| | | | | |
|---|---|---|---|---|
| 6,742,116 B1* | 5/2004 | Matsui | .................. | H04L 9/0894 709/204 |
| 2005/0223216 A1* | 10/2005 | Chan | ..................... | H04L 63/083 713/153 |

(Continued)

FOREIGN PATENT DOCUMENTS

| NO | WO 2012144909 A1 * | 10/2012 | ......... H04L 63/0457 |
|---|---|---|---|
| WO | WO 2012048347 A1 * | 4/2012 | ........... H04L 9/0822 |

OTHER PUBLICATIONS

Co-Pending U.S. Appl. No. 14/044,049 by Chan, M.A. et al., filed Oct. 2, 2013.

*Primary Examiner* — Morshed Mehedi
*Assistant Examiner* — Shu Chun Gao (57) ABSTRACT

Technology is disclosed herein for sharing encrypted data within a client-server distributed data storage system. According to at least one embodiment, a first computing device encrypts multiple data sets of the first computing device using symmetric encryption keys. Each of the data sets is encrypted using a different symmetric encryption key among the symmetric encryption keys. The first computing device shares the encrypted data sets with a second computing device. The first computing device further sends the symmetric encryption keys to the second computing device via a secured channel. The symmetric encryption keys are suitable for decrypting the encrypted data sets at the second computing device. The secured channel is through a server (Continued)

connected with the first and second computing devices. The server cannot access the contents of the secured channel and cannot access contents of the encrypted data sets.

25 Claims, 6 Drawing Sheets

(51) Int. Cl.
*G06F 17/30* (2006.01)
*H04L 29/08* (2006.01)
*H04L 12/26* (2006.01)
*H04L 9/32* (2006.01)
*G06F 9/44* (2006.01)
*G06F 9/445* (2006.01)
*H04W 8/24* (2009.01)

(52) U.S. Cl.
CPC ......... *G06F 9/4416* (2013.01); *G06F 17/3007* (2013.01); *G06F 17/3015* (2013.01); *G06F 17/30085* (2013.01); *G06F 17/30091* (2013.01); *G06F 17/30194* (2013.01); *H04L 9/0825* (2013.01); *H04L 9/3226* (2013.01); *H04L 43/04* (2013.01); *H04L 65/4069* (2013.01); *H04L 67/10* (2013.01); *H04L 67/1095* (2013.01); *H04L 67/1097* (2013.01); *H04L 67/2823* (2013.01); *H04L 67/2842* (2013.01); *H04L 67/40* (2013.01); *H04L 67/42* (2013.01); *H04W 8/24* (2013.01); *G06F 17/30011* (2013.01); *G06F 17/30286* (2013.01); *Y02B 60/188* (2013.01)

(56) References Cited

U.S. PATENT DOCUMENTS

| | | | |
|---|---|---|---|
| 2012/0179909 A1* | 7/2012 | Sagi | H04L 63/045 713/167 |
| 2013/0013931 A1* | 1/2013 | O'Hare | G06F 21/62 713/189 |
| 2013/0086695 A1* | 4/2013 | Lakshminarayanan | G06F 21/31 726/28 |

* cited by examiner

FILE SHARING WITH CLIENT SIDE ENCRYPTION

PRIORITY CLAIM

This application claims to the benefit of U.S. Provisional Patent Application No. 61/708,794, entitled "CLOUD COMPUTING INTEGRATED OPERATING SYSTEM", which was filed on Oct. 2, 2012, which is incorporated by reference herein in its entirety.

FIELD OF THE INVENTION

At least one embodiment of the present invention pertains to mobile devices, and more particularly, to mobile devices capable of encrypting files for file sharing purposes.

BACKGROUND

It is common practice for mobile computing devices to share data. A mobile computing device can share digitally stored information, e.g., contacts, computer programs, multimedia, documents with other devices. The sharing of data can be achieved via various methods via, e.g., computer networks, removable media or wireless communications.

In order to share a file with another device, the data of the file has to be transferred over a network or other media. Unauthorized access of the file data being transferred can jeopardize privacy and confidentiality of the users of the devices. Data security of the file sharing process becomes an important issue in view of the popularity of interconnected mobile computing devices.

SUMMARY

Technology introduced herein provides a mechanism for securely sharing encrypted data within a client-server distributed data storage system. According to at least one embodiment, a first computing device encrypts multiple data sets of the first computing device using symmetric encryption keys. Each of the data sets is encrypted using a different symmetric encryption key among the symmetric encryption keys. The first computing device shares the encrypted data sets with a second computing device. The first computing device further sends the symmetric encryption keys to the second computing device via a secured channel. The symmetric encryption keys are suitable for decrypting the encrypted data sets at the second computing device. The secured channel is through a server connected with the first and second computing devices. The server cannot access the contents of the secured channel and cannot access contents of the encrypted data sets.

The encrypted files are stored in the server, but the server does not have the ability to decrypt the encrypted files or access contents of the encrypted files, even though the secured channel goes through the server. The secured channel is encoded using a common key known by the first and second computing devices, but unknown to the server. Therefore the first and second computing devices exchange symmetric encryption keys for the purposes of decrypting files, without the risk of leaking the symmetric encryption keys to the server.

Other aspects of the technology introduced here will be apparent from the accompanying figures and from the detailed description which follows.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION

References in this specification to "an embodiment," "one embodiment," or the like, mean that the particular feature, structure, or characteristic being described is included in at least one embodiment of the present invention. Occurrences of such phrases in this specification do not all necessarily refer to the same embodiment, however.

Figure 1:
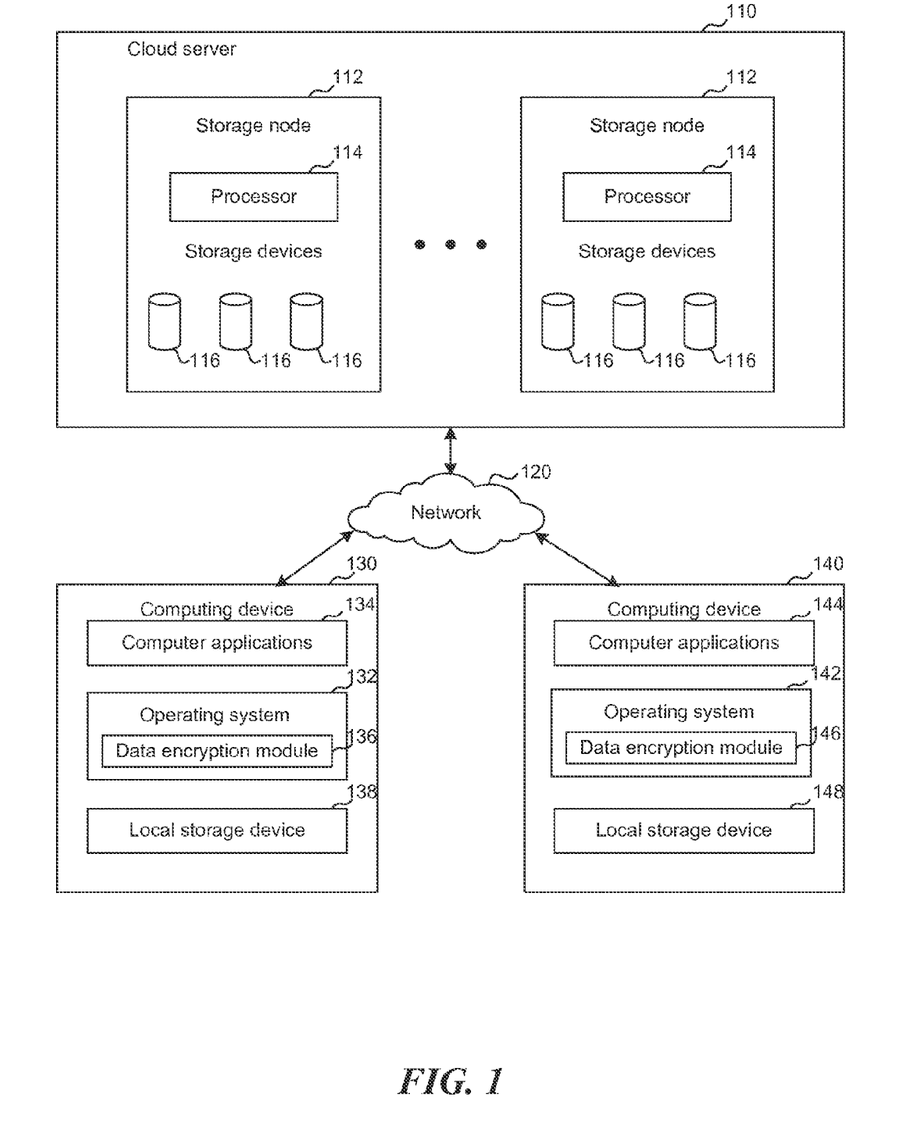
FIG. 1 illustrates an example system for computing devices connected to a cloud server for secured file sharing.

FIG. 1 illustrates an example system for computing devices connected to a cloud server for secured file sharing. The system includes a cloud server 110 configured to communicate with the computing devices. In one embodiment, the cloud server 110 can be a server cluster having computer nodes interconnected with each other by a network. The cloud server 110 can contain storage nodes 112. Each of the storage nodes 112 contains one or more processors 114 and storage devices 116. The storage devices can include optical disk storage, RAM, ROM, EEPROM, flash memory, phase change memory, magnetic cassettes, magnetic tapes, magnetic disk storage or any other computer storage medium which can be used to store the desired information.

The computing devices 130 and 140 can share files via the cloud server 110. The files are transferred to and from the cloud server 110 via a network 120. The network 120 can be, e.g., the Internet. Although FIG. 1 illustrates two computing devices 130 and 140, a person having ordinary skill in the art can readily understand that the technology disclosed herein can be applied to a single computing device or more than two computing devices connected to the cloud server 110. Although the embodiment illustrates in FIG. 1 uses files as examples, a person having ordinary skill in the art will also readily understand that the technology disclosed herein can be applied to forms of organizing data other than files, e.g., messages, data streaming, data blocks, etc.

The computing device 130 includes an operating system 132 to manage the hardware resources of the computing device 130 and provides services for running computer applications 134 (e.g., mobile applications running on mobile devices). The computer applications 134 stored in the computing device 130 require the operating system 132 to properly run on the device 130. The computing device 130 includes at least one local storage device 138 to store the computer applications and user data. The computing device 130 or 140 can be a desktop computer, a laptop computer, a tablet computer, an automobile computer, a game console, a smart phone, a personal digital assistant, or other computing devices capable of running computer applications, as contemplated by a person having ordinary skill in the art.

The computer applications 134 stored in the computing device 130 can include applications for general productivity and information retrieval, including email, calendar, contacts, and stock market and weather information. The computer applications 134 can also include applications in other categories, such as mobile games, factory automation, GPS and location-based services, banking, order-tracking, ticket purchases or any other categories as contemplated by a person having ordinary skill in the art.

The operating system 132 of the computing device 130 can include a data encryption module 136 to generate a symmetric encryption key for each of files of the computing device 130 that need to be encrypted and encrypt these files using the symmetric encryption keys. The data encryption module 136 may continuously monitor the file system of the computing device 130 and encrypt any newly generated files of the device 130 in real time.

In one embodiment, the computing device 130 maintains a private device key. The private device key is unique to the computing device 130. The computing device 130 guards the private device key as a secret and does not reveal the private device key to other servers or devices, e.g., the cloud server 110 and the computing device 140.

Using the private device key, the data encryption module 136 generates multiple symmetric encryption keys for encrypting the files. Each file is encrypted using a different symmetric encryption key. The symmetric encryption keys can be generated based on the private device key and another initialization variable. The initialization variable can be randomly generated, dependent upon the individual file, or even dependent upon user inputs. For instance, the initialization variable can be a series of pseudorandom numbers, and each of the symmetric encryption keys are generated based on the private device key and one of the pseudorandom numbers.

For each file to be encrypted, the data encryption module 136 uses one of the symmetric encryption keys to encrypt that individual file. In some embodiments, the data encryption module 136 may further maintain a data structure (e.g. a log file or a database) to record the associations between the files and symmetric encryption keys.

The computing device 130 may synchronize the encrypted files with the cloud server 110. The computing device 130 may transmit the encrypted files to the cloud server 110. The cloud server 110 stores the encrypted files for the computing device 130. When a file is updated, the computing device 130 can encrypt the updated file again (e.g., using a new symmetric encryption key, or the old symmetric encryption key for the original version of the file), and sends the encrypted updated file to the cloud server 110. The cloud server 110 replaces the original encrypted file with the encrypted updated file on its storage.

When the computing device 130 shares a file with another device, e.g., the computing device 140, the computing device 130 notifies the cloud server 110 with an identification of the file and an identification of the targeting device. The cloud server 110 grants the access of the encrypted file to the computing device 140. The computing device 140 is able to retrieve the encrypted file from the cloud server 110.

Alternatively, the computing device 130 may directly send the encrypted file to the computing device 140 over a network (e.g., the Internet), without going through a middle server.

The computer applications 134 running at the computing device 130 need not be aware that the files for the device 130 are encrypted. The data encryption module 136 is responsible for conducting the encryption process. Furthermore, when any of computer applications 134 needs to read a file, the data encryption module 136 can decrypt the corresponding encrypted file so that the application can access the data content of the file.

Figure 2:
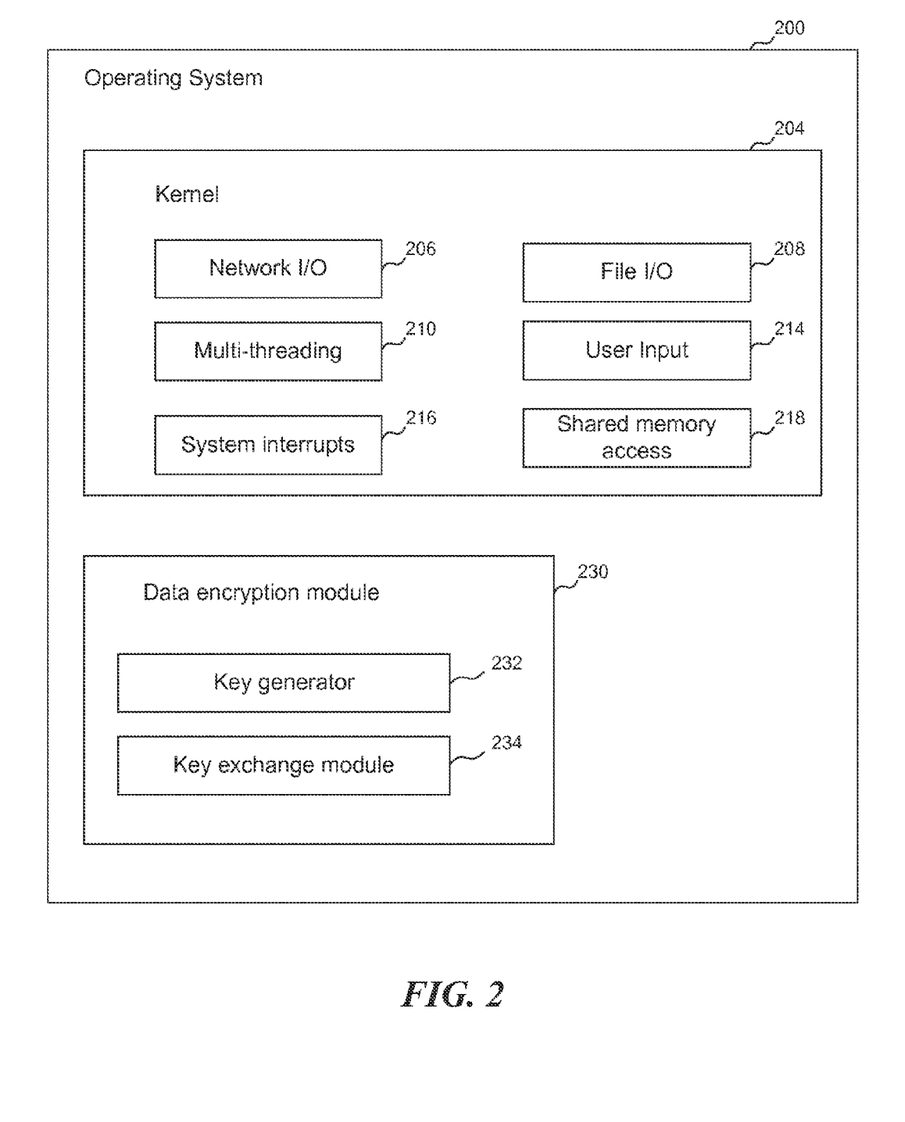
FIG. 2 illustrates an example operating system of a computing device for data encryption and key exchange.

Once the encrypted file is transferred to the target device, the source server needs a secure way to transfer the symmetric encryption key for the file to the target device so that the target device can access the contents of the file by encrypting the encrypted file. FIG. 2 illustrates an example operating system of a computing device for data encryption and key exchange, according to one embodiment. The operating system 200 includes a kernel 204. The kernel 204 provides interfaces to hardware of the electronic device for the computer applications running on top of the kernel 204, and supervises and controls the computer applications. The kernel 204 isolates the computer applications from the hardware. The kernel 204 may include one or more intervening sources that can affect execution of a computer application. In one embodiment, the kernel 204 includes a network I/O module 206, a file I/O module 208, multi-threading module 210, user input 214, system interrupts 216, and shared memory access 218.

A data encryption module 230 can run on top of the kernel 204. Alternatively the kernel 204 can be modified to include the data encryption module 230. The data encryption module 230 may include a key generator 232 and a key exchange module 234. The key generator 232 may generate a series of symmetric encryption keys so that each file can be encrypted using a different symmetric encryption key.

The key exchange module 234 is responsible for securely transferring one or more symmetric encryption keys to another device. In some embodiments, the key exchange module 234 can communicate with the other device via a cloud server to establish a secured channel. The key exchange module 234 transmits the symmetric encryption key to the other device via the secured channel. Because the secured channel is encrypted, the cloud server cannot access the symmetric encryption key even though the encrypted data of the symmetric encryption key are transferred through the cloud server. Similarly, a device wiretapping the network can only receive the physical data packets transferred over the network (of which the secured channel was created on top), but cannot access the symmetric encryption key because the key being transferred over the secured channel has been encrypted.

Figure 3:
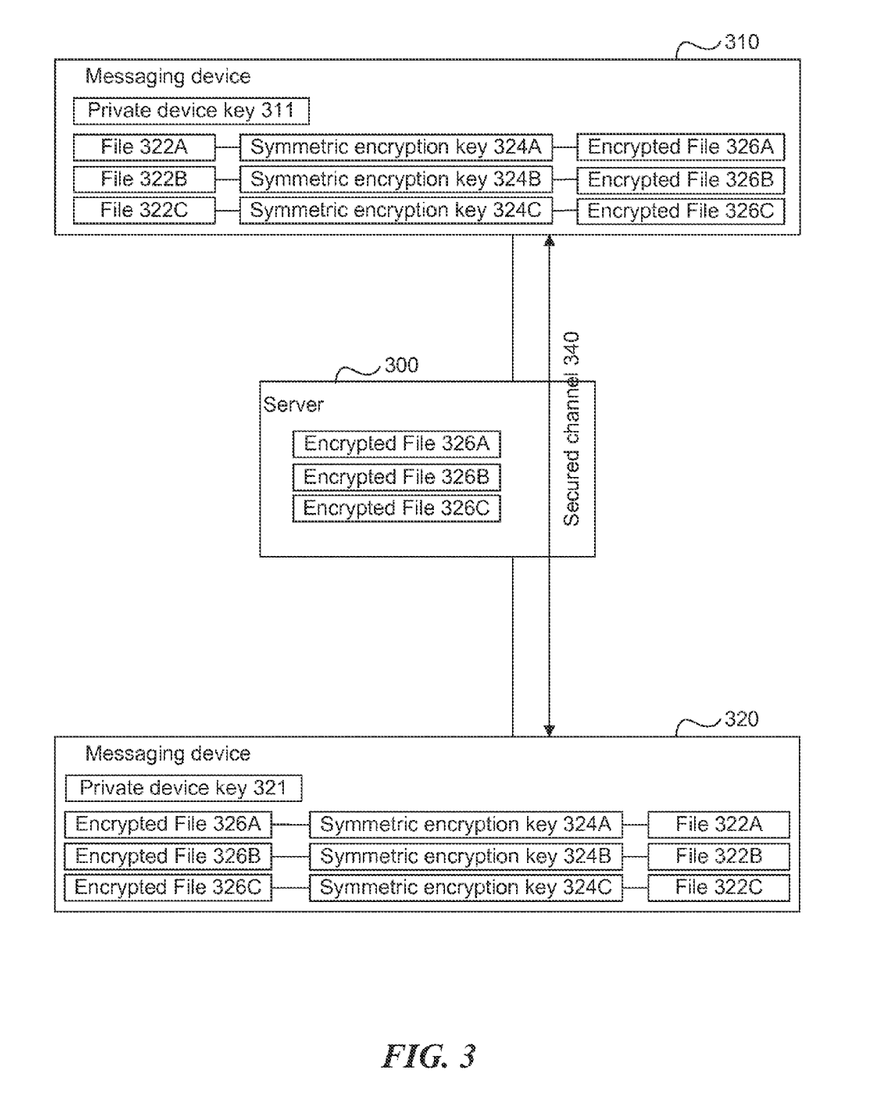
FIG. 3 illustrates an example of messaging devices connected to a cloud-based server.

The technology disclosed herein can be applied to various computing devices including, e.g., devices capable of receiving emails or internet messages. For instance, FIG. 3 illustrates an example of messaging devices connected to a cloud-based server. As depicted in FIG. 3, a server 300 may provide a cloud-based service for storing encrypted files for the devices. The devices may be connected to the server 300 via a network, e.g., the Internet. Examples of messaging devices 310 and 320 may include, but are not limited to, a mobile phone, a smartphone, a personal digital assistant (PDA), a tablet, a mobile game console, a laptop computer, a desktop computer, or any other devices having communication capability.

The messaging device 310 maintains a private device key 311. The messaging device 310 keeps the private device key 311 as a secret and does not share the private device key 311 with the server 300 or the messaging device 320. Using the private device key 311, the messaging device 310 generates multiple symmetric encryption keys 324A-324B for files 322A-322C. The files 322A-322C may contain messaging data or other types of data. Each file among the files 322A-322C is encrypted using one of the symmetric encryption keys 324A-324C. The messaging device 310 transfers the encrypted files 326A-326C to the server 300 for storage purpose. Since 326A-326C are encrypted, it is not necessary to transfer the encrypted files 326A-326C in an encrypted network connection. However, the encrypted files 326A-326C can be transferred in an encrypted network connection.

In some embodiments, the messaging device 310 may remove the files 322A-322C and encrypted files 326A-326C once the server 300 stores the encrypted files 326A-326C. The server 300 acts as a cloud storage for the messaging device 310. The messaging device 310 still maintains the private device key 311 and symmetric encryption keys 324A-324C. The server 300 does not have access to the private device key 311 and symmetric encryption keys 324A-324C. Without the encryption keys, the server 300 cannot access the data contents of the encrypted files 326A-326C stored in the server 300.

The messaging device 310 can share one or more of the files 326A-326C with messaging device 320 by instructing the server 300 to grant access of the encrypted files 326A-326C to the messaging device 320. The messaging device 320 is then able to download the encrypted files 326A-326C from the server 300.

The messaging device 310 further establishes a secured channel 340 with the messaging device 320. The secured channel may be established on top of the existing network connections between the server 300 and the messaging devices, as illustrated in FIG. 3. The messaging devices 310 and 320 secure the channel 340 by negotiating and agreeing upon an encryption method for data transferred through the channel 340 (e.g., the symmetric encryption keys). Even when the symmetric encryption keys 324A-324C are transferred through the server 300, the server 300 cannot access the symmetric encryption keys 324A-324C since all data through the channel 340 are encrypted.

Alternatively, the secured channel may be established on top of a direct network communication between the messaging device 310 and the messaging device 320.

The messaging device 320 retrieves the symmetric encryption keys 324A-324C from the messaging device 310 via the secured channel 340. The messaging device 320 decrypts the encrypted files 326A-326C using the retrieved symmetric encryption keys 324A-324C to generate the decrypted files 322A-322C. The messaging device 320 then can access the contents of the files 322A-322C (e.g., messages) shared by the messaging device 310.

As illustrated in FIG. 3, the messaging device 320 can also maintain a private device key 321. Similar to the private device key 311 of the messaging device 310, the messaging device 320 can use the private device key 321 to encrypt files of the device 320 (not shown in FIG. 3). The private device key 321 is also unique to the device 320 and different from the private device key 311. The messaging device 310 keeps the private device key 321 as a secret and does not share the key 321 with the server or the messaging device 310.

The technology disclosed in FIG. 3 can be applied to devices having less than three files or more than three files. Although FIG. 3 illustrates devices for sharing messaging data as an example, a person having ordinary skill in the art can readily understand that a device can use the technology disclosed herein to encrypt and exchange different types of data, e.g., game data, photo data, video data, audio data, user data, application program data, operating system data, etc. In some embodiments, all data of a device can be encrypted and transmitted to a server.

Figure 4:
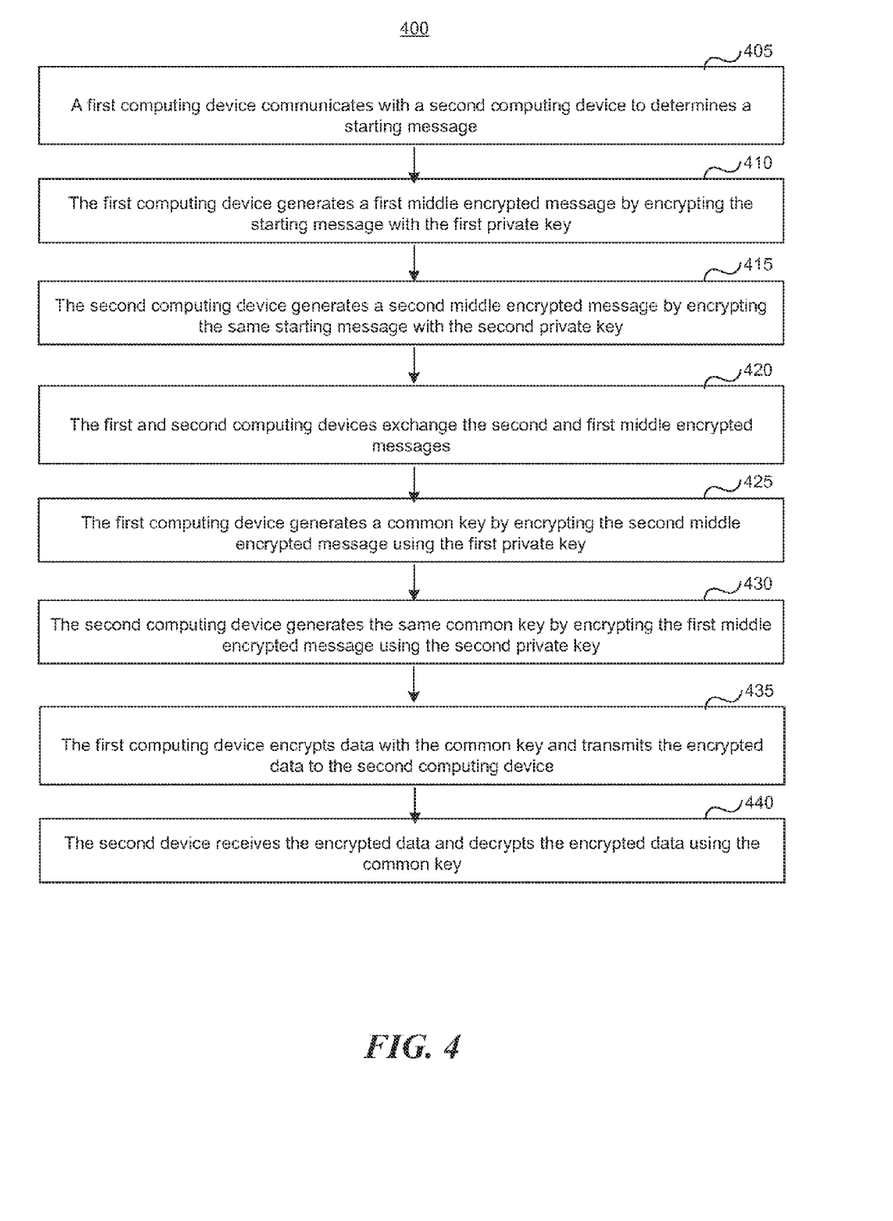
FIG. 4 illustrates an example of a process for establishing a secured channel between two computing devices connected to a cloud server.

FIG. 4 illustrates an example of a process 400 for establishing a secured channel between two computing devices connected to a cloud server. The secured channel can be used to exchange symmetric encryption keys for the purposes of decrypting the transferred encrypted files. A first computing device has a first private key. A second computing device has a second private key. The first computing device does not know the second private key before, during, and after establishing the secured channel. The second computing device also does not know the first private key before, during, and after establishing the secured channel. The private keys can be private device keys as illustrated in FIG. 3, or other keys generated by the devices.

The process 400 starts at step 405, wherein a first computing device communicates with a second computing device to determine a starting message. This can be accomplished by, e.g. the first computing device proposing a starting message to the second computing device, and the second computing device confirming the staring value to the first computing device. In other words, the first and second computing devices agree on an arbitrary starting value. The starting message can be transferred via the cloud server without encryption. The cloud server will not be able to decrypt the secured channel established later, even if the cloud server knows the content of the starting message.

At step 410, the first computing device generates a first middle encrypted message by encrypting the starting message with the first private key. At step 415, the second computing device generates a second middle encrypted message by encrypting the same starting message with the second private key. At step 420, the first and second computing devices exchange the second and first middle encrypted messages. In other words, the first computing device sends the first middle encrypted message to the second computing device; the second computing device sends the second middle encrypted message to the first computing device.

The cloud server can be responsible for exchanging the middle encrypted messages. The first and second middle encrypted messages can be transferred via the cloud server without further encryption. The cloud server will not be able to decrypt the secured channel established later, even if the cloud server can access the middle encrypted messages.

At step 425, the first computing device generates a common key by encrypting the second middle encrypted message using the first private key. At step 430, the second computing device generates the same common key by encrypting the first middle encrypted message using the second private key. The first and second computing device generates the same common key without revealing the first and second private keys to each other. The server responsible for exchanging the middle encrypted messages does not have access to the common key, or the first and second private keys, since no common key or private keys have been transferred through the cloud server.

The common key can be determined by various methods. Like the example illustrated in FIG. 5, the common key can be determined based on communications between the first and second computing devices without revealing private device keys of the first and second computing devices to each other. The server does not have access to the common key.

A secured channel can be established by using the common key to encrypt data communicated between the first and second computing device. At step 435, the first computing device encrypts data with the common key and transmits the encrypted data to the second computing device. At step 440, the second device receives the encrypted data and decrypts the encrypted data using the common key. The channel is secured because the cloud server does not know the common key and therefore cannot access the contents of the encrypted data transferred via the secured channel.

The secured channel is two-way. The second computing device can also send out data encrypted using the common key; in turn, the first computing device receives and decrypts the data using the common key.

Once the secured channel is established, the first and second computing devices can exchange data to which the cloud server cannot access. For instance, the first and second computing devices can exchange symmetric encryption keys as illustrated in FIG. 3.

Those skilled in the art will appreciate that the logic illustrated in FIG. 4 and described above, and in each of the flow diagrams discussed below if any, may be altered in a variety of ways. For example, the order of the logic may be rearranged, substeps may be performed in parallel, illustrated logic may be omitted, other logic may be included, etc. For instance, the second computing device can generate the second middle encrypted message before the first computing device generates the first middle encrypted message (or simultaneously).

Figure 5:
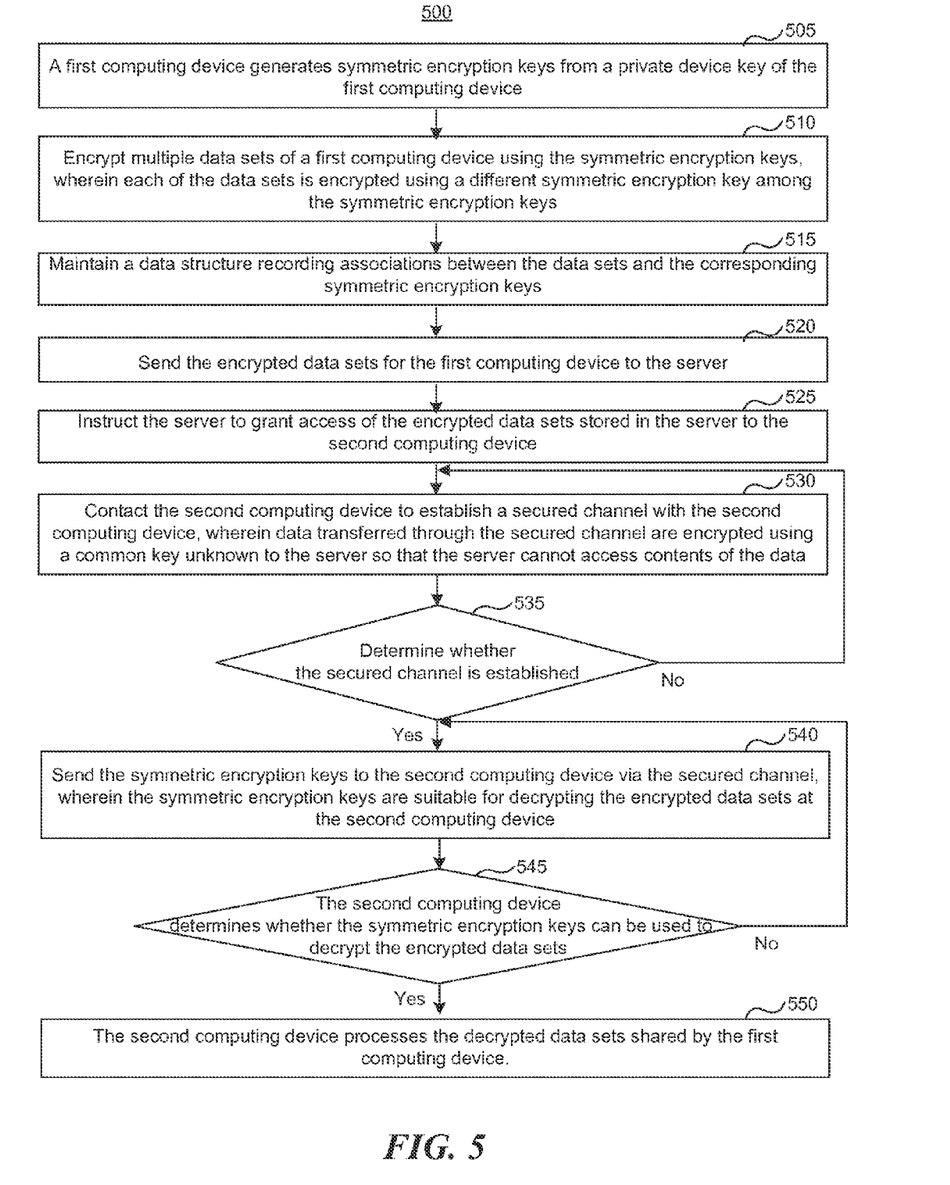
FIG. 5 illustrates an example of a process for securely sharing data among computing devices connected to a server.

FIG. 5 illustrates an example of a process 500 for securely sharing data among computing devices connected to a server. The process 500 starts at step 505, where a first computing device generates symmetric encryption keys from a private device key of the first computing device. The server and the second computing device do not have access to the private device key of the first computing device.

At step 510, the first computing device encrypts multiple data sets of a first computing device using the symmetric encryption keys, wherein each of the data sets is encrypted using a different symmetric encryption key among the symmetric encryption keys. The data sets can include different types of data structures, e.g., data files. Because each data set is encrypted with a different symmetric encryption key, when two of the multiple data sets contain the same content, data of two encrypted data sets from the two data sets are different. Therefore, two identical data sets cannot be identified by comparing the encrypted versions of these two identical data sets. This helps protect the data privacy of users of the devices.

At step 515, the first computing device maintains a data structure recording associations between the data sets and the corresponding symmetric encryption keys. Alternatively, the first computing device can store each the symmetric encryption keys alongside the corresponding data set.

The first computing device can share the encrypted data sets with a second computing device. For instance, at step 520, the first computing device sends the encrypted data sets for the first computing device to the server. The server can store the encrypted data sets but cannot access contents of the encrypted data sets. At step 525, the first computing device instructs the server to grant access of the encrypted data sets stored in the server to the second computing device. Alternatively, the first computing device can directly send the encrypted data sets to the second computing device.

At step 530, the first computing device contacts the second computing device to establish a secured channel with the second computing device, wherein data transferred through the secured channel are encrypted using a common key unknown to the server so that the server cannot access contents of the data. An example of a process establishing a secured channel is illustrated in FIG. 4. The server does not have access to the common key or the first and second private keys. Therefore, the server cannot know what is transferred via the secured channel, even that the secured channel is through the server.

Alternatively, the secured channel can be established using asymmetric key pair of the second computing device. The first computing device can retrieve an asymmetric public key of the second computing device that pairs with an asymmetric private key of the second computing device. Then the first computing device encrypts the symmetric encryption keys into encrypted symmetric encryption keys using the asymmetric public key of the second computing device. The first computing device sends the encrypted symmetric encryption keys to the server or the second computing device, so that the second computing device can retrieve the encrypted symmetric encryption keys and use the asymmetric private key to decrypt the encrypted symmetric encryption keys, while the server cannot decrypt the encrypted symmetric encryption keys using the asymmetric public key of the second computing device.

The secured channel can also be established using user provided channel password which the user provided to the second computing device out of band. The first computing device prompts, via a user interface of the first computing device, a user to provide a channel password. The channel password has been provided to the second computing device in a way separate from the network connection relayed by the server between the first and second computing devices. For instance, the user may have provided the channel password verbally or over a text message to a user of the second computing device. The first computing device encrypts the symmetric encryption keys into encrypted symmetric encryption keys using the channel password. The first computing device sends the encrypted symmetric encryption keys to the server or the second computing device, so that the second computing device can retrieve the encrypted symmetric encryption keys and use the channel password to decrypt the encrypted symmetric encryption keys, while the server cannot access the channel password.

At step 535, the first computing device determines whether the secured channel is established. If not, the process 500 repeats the step 530 trying to establish the secured channel.

If the secured channel is established, at step 540, the first computing device sends the symmetric encryption keys to the second computing device via the secured channel, wherein the symmetric encryption keys are suitable for decrypting the encrypted data sets at the second computing device. In other words, the first computing device encrypts the symmetric encryption keys using the common key and transfers the encrypted symmetric encryption keys to the second computing device. While the secured channel is through a server connected to the first and second computing devices, the server cannot access the contents of the secured channel and cannot access contents of the encrypted data sets.

The secured channel is encoded (e.g., encrypted) using a common key known by the first and second computing devices, but unknown to the server. Therefore the first and second computing devices exchanging symmetric encryption keys for the purposes of decrypting files, without the risk of leaking the symmetric encryption keys to the server.

At step 545, the second computing device determines whether the symmetric encryption keys can be used to decrypt the encrypted data sets. If not, the second computing device can request the first computing device to resend the encrypted symmetric encryption keys via the secured channel as the step 540 suggests. If the symmetric encryption keys can be used to decrypt the encrypted data sets, the second computing device processes the decrypted data sets shared by the first computing device.

Figure 6:
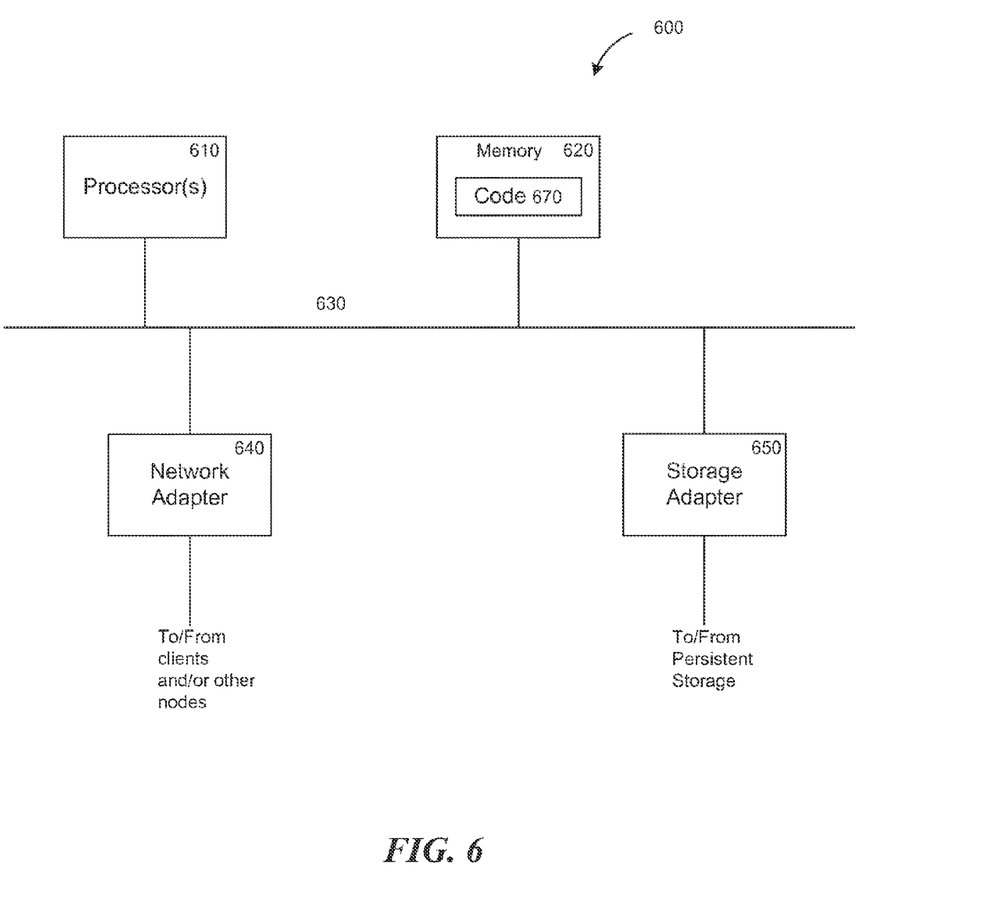
FIG. 6 is a high-level block diagram showing an example of the architecture of a computer, which may represent any computing device or server described herein.

FIG. 6 is a high-level block diagram showing an example of the architecture of a computer 600, which may represent any computing device or server described herein. The computer 600 includes one or more processors 610 and memory 620 coupled to an interconnect 630. The interconnect 630 shown in FIG. 6 is an abstraction that represents any one or more separate physical buses, point to point connections, or both connected by appropriate bridges, adapters, or controllers. The interconnect 630, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 610 is/are the central processing unit (CPU) of the computer 600 and, thus, control the overall operation of the computer 600. In certain embodiments, the processor(s) 610 accomplish this by executing software or firmware stored in memory 620. The processor(s) 610 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 620 is or includes the main memory of the computer 600. The memory 620 represents any form of random access memory (RAM), read-only memory (ROM), flash memory, or the like, or a combination of such devices. In use, the memory 620 may contain a code 670 containing instructions according to the technology disclosed herein.

Also connected to the processor(s) 610 through the interconnect 630 are a network adapter 640 and a storage adapter 650. The network adapter 640 provides the computer 600 with the ability to communicate with remote devices, over a network and may be, for example, an Ethernet adapter or Fibre Channel adapter. The network adapter 640 may also provide the computer 600 with the ability to communicate with other computers. The storage adapter 650 allows the computer 600 to access a persistent storage, and may be, for example, a Fibre Channel adapter or SCSI adapter.

The code 670 stored in memory 620 may be implemented as software and/or firmware to program the processor(s) 610 to carry out actions described above. In certain embodiments, such software or firmware may be initially provided to the computer 600 by downloading it from a remote system through the computer 600 (e.g., via network adapter 640).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic", as used herein, can include, for example, programmable circuitry programmed with specific software and/or firmware, special-purpose hardwired circuitry, or a combination thereof.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

What is claimed is:

1. A computer implemented method for sharing encrypted data within a client-server distributed data storage system, the method comprising:

encrypting multiple data sets of a first computing device using symmetric encryption keys, wherein each of the data sets is encrypted using a different symmetric encryption key among the symmetric encryption keys;

sharing the encrypted data sets with a second computing device; and sending the symmetric encryption keys to the second computing device via a secured channel, wherein the symmetric encryption keys are suitable for decrypting the encrypted data sets at the second computing device; and establishing the secured channel between the first computing device and the second computing device, wherein data transferred through the secured channel are encrypted so that the server cannot access contents of the data, wherein the secured channel is through a server connected with the first and second computing devices, the server cannot access the contents of the secured channel and cannot access contents of the encrypted data sets, wherein the step of establishing the secured channel includes:

determining a starting message between the first and second computing devices;

generating, by the first computing device, a first middle encrypted message by encrypting the starting message with a first private key of the first computing device;

sending, to the second computing device, the first middle encrypted message;

receiving, from the second computing device, a second middle encrypted message, wherein the second middle encrypted message is generated by the second computing device by encrypting the starting message with a second private key of the second computing device; and generating, by the first computing device, a common key for the secured channel by encrypting the second middle encrypted message using the first private key.

2. The computer implemented method of claim 1, wherein the step of sending the symmetric encryption keys includes:

retrieving, at the first computing device, an asymmetric public key of the second computing device that pairs with an asymmetric private key of the second computing device;

encrypting the symmetric encryption keys into encrypted symmetric encryption keys using the asymmetric public key of the second computing device; and sending the encrypted symmetric encryption keys to the server or the second computing device so that the second computing device can retrieve the encrypted symmetric encryption keys and use the asymmetric private key to decrypt the encrypted symmetric encryption keys, while the server cannot decrypt the encrypted symmetric encryption keys using the asymmetric public key of the second computing device.

3. The computer implemented method of claim 1, wherein the step of sending the symmetric encryption keys includes:

prompting, via a user interface of the first computing device, a channel password provided by a user, wherein the channel password has been provided to the second computing device in a way separate from a network connection relayed by the server between the first and second computing devices;

encrypting the symmetric encryption keys into encrypted symmetric encryption keys using the channel password; and sending the encrypted symmetric encryption keys to the server or the second computing device so that the second computing device can retrieve the encrypted symmetric encryption keys and use the channel password to decrypt the encrypted symmetric encryption keys, while the server cannot access the channel password.

4. The computer implemented method of claim 1, further comprising:

generating the symmetric encryption keys from a private device key of the first computing device, wherein the server and the second computing device do not have access to the private device key of the first computing device.

5. The computer implemented method of claim 1, wherein when two of the multiple data sets contain the same content, data of two encrypted data sets from the two data sets are different.

6. The computer implemented method of claim 1, further comprising:

storing each the symmetric encryption keys alongside the corresponding data set.

7. The computer implemented method of claim 1, wherein the step of sharing includes:

sending the encrypted data sets for the first computing device to the server; and instructing the server to grant access of the encrypted data sets stored in the server to the second computing device.

8. The computer implemented method of claim 1, wherein the step of establishing includes:

determining a common key based on communications between the first and second computing devices without revealing private device keys of the first and second computing devices to each other, wherein the server does not have access to the common key; and wherein the data transferred through the secured channel are encrypted using the common key.

9. The computer implemented method of claim 1, wherein the common key is also generated by the second computing device by encrypting the first middle encrypted message using the second private key.

10. The computer implemented method of claim 1, wherein the first private key is a private device key of the first computing device, wherein the symmetric encryption keys are generated from the private device key, and the server and the second computing device do not have access to the private device key.

11. The computer implemented method of claim 1, wherein the server does not have access to the common key or the first and second private keys.

12. The computer implemented method of claim 1, wherein the step of establishing further includes:

encrypting, by the first computing device, data to be transferred via the secured channel using the common key such that the encrypted data transferred via the secured channel can be decrypted by the second computing device using the common key.

13. The computer implemented method of claim 1, wherein the server stores the encrypted data sets but cannot access contents of the encrypted data sets.

14. The computer implemented method of claim 1, wherein the data sets include data files.

15. A method for transferring files between computing devices connected to a server, the method comprising:

generating, at a first computing device, multiple symmetric encryption keys from a private device key of the first computing device, wherein each of the symmetric encryption keys corresponds to one of the files of the first computing device;

encrypting, at the first computing device, each of the files into an encrypted file using a corresponding symmetric encryption key among the symmetric encryption keys;

sending the encrypted files to a server, wherein the encrypted files are suitable to be stored in the server;

determining a common key for the first and second computing device, wherein the first and second computing devices know the common key while the server does not know the common key, wherein the common key is determined by a process including:

receiving, from the second computing device, a second middle encrypted message, wherein the second middle encrypted message is generated by the second computing device by encrypting a starting message with a second private key of the second computing device, wherein the starting message is shared by the first computing device and the second computing device; and generating, by the first computing device, the common key by encrypting the second middle encrypted message using a first private key of the first computing device, wherein the common key is also generated at the second computing device by encrypting a first middle encrypted message using the second private key of the other computing device, wherein the first middle encrypted message is generated at the computing device by encrypting the starting message with the first private key of the computing device; and securely transmitting the symmetric encryption keys to the second computing device using the common key.

16. The method of claim 15, wherein the step of securely transmitting includes:

encrypting the symmetric encryption keys using the common key;

sending the encrypted symmetric encryption keys to the server; and instructing the server to grant access of the encrypted symmetric encryption keys to the second computing device.

17. The method of claim 15, wherein the encrypted symmetric encryption keys are suitable to be decrypted by the second computing device using the common key.

18. The method of claim 15, wherein the encrypted files are suitable to be decrypted by the second computing device using the symmetric encryption keys.

19. The method of claim 15, wherein the server is configured to relay the encrypted symmetric encryption keys to the second computing device but cannot access the symmetric encryption keys.

20. The method of claim 15, further comprising:

maintaining a database for relationships between the files and the symmetric encryption keys.

21. The method of claim 15, wherein each of the symmetric encryption keys is suitable for both encryption and decryption of one of the files.

22. A computing device, comprising:

a hardware processor;

a data encryption module which, when executed by the hardware processor, encrypts each of multiple files into an encrypted file using one of multiple symmetric encryption keys, wherein each of the symmetric encryption keys corresponds to one of the files of the first computing device;

a networking interface configured to send the encrypted files to a server, wherein the encrypted files are suitable to be stored in the server; and a secured channel module which, when executed by the hardware processor, transfers encrypted symmetric encryption keys that are generated using a common key to another computing device;

wherein the common key is suitable for decrypting the encrypted symmetric encryption keys into the symmetric encryption keys, and the encrypted files are suitable to be transmitted to the other computing device and to be decrypted using the symmetric encryption keys, wherein the common key is determined by a process including:

receiving, from the other computing device, a second middle encrypted message, wherein the second middle encrypted message is generated by the other computing device by encrypting a starting message with a second private key of the other computing device, wherein the starting message is shared by the computing device and the other computing device; and generating, by the first computing device, the common key for the secured channel by encrypting the second middle encrypted message using a first private key of the computing device, wherein the common key is also generated at the other computing device by encrypting a first middle encrypted message using the second private key of the other computing device, wherein the first middle encrypted message is generated at the computing device by encrypting the starting message with the first private key of the computing device.

23. The computing device of claim 22, wherein the symmetric encryption keys are encrypted and then transferred via the secured channel such that the other computing device has access to the symmetric encryption keys but the server does not have access to the symmetric encryption keys.

24. The computing device of claim 22, wherein the networking interface is further configured to instruct the server to grant access of the encrypted files to the other computing device.

25. The computing device of claim 22, wherein the secured channel module is established such that the encrypted symmetric encryption keys are relayed by the server to the other computing device but the server cannot decrypt the encrypted symmetric encryption keys.

* * * * *